United States Patent Office 3,330,859
Patented July 11, 1967

3,330,859
ALKYL ESTERS OF CARBOXYLIC ACIDS CONTAINING AN ALKYLHYDROXYPHENYL GROUP
Martin Dexter, Briarcliff Manor, John D. Spivack, Spring Valley, and David H. Steinberg, Bronx, N.Y., assignors to Geigy Chemical Corporation, Greenburgh, N.Y., a corporation of Delaware
No Drawing. Filed Mar. 24, 1964, Ser. No. 354,434
10 Claims. (Cl. 260—473)

This application is a continuation-in-part of Ser. No. 276,192, filed Apr. 29, 1963, which in turn is a continuation-in-part of Ser. No. 164,618, filed Jan. 5, 1962.

This invention pertains to novel carboxylic acid esters which are useful in the stabilization of organic materials normally subject to oxidative deterioration.

Materials which are stabilized according to the present invention include synthetic organic polymeric substances such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide; polyesters such as polymethylene terephthalates; polycarbonates; polyacetols; polystyrene, polyethyleneoxide; and copolymers such as those of high impact polystyrene containing copolymers of butadiene and styrene and those formed by the copolymerization of acrylonitrile, butadiene and/or styrene. Other materials stabilized according to the present invention includes lubricating oil of the aliphatic ester type, e.g., di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic, diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition. A particularly advantageous range for polyolefins such as polypropylene is from about 0.1% to about 1%.

The compounds of the present invention are represented by the formula:

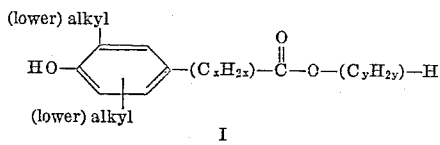

I wherein $x$ has a value of from 0 to 6 inclusively and $y$ has a value of from 6 to 30 inclusively.

Particularly useful compounds of the above class are those of the formula:

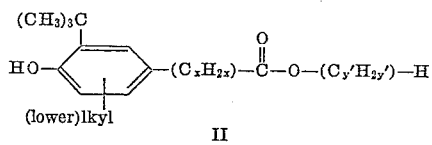

II in which $x$ is as above defined and $y'$ has a value of from 6 to 20.

Within this group the preferred species may be represented by the formula:

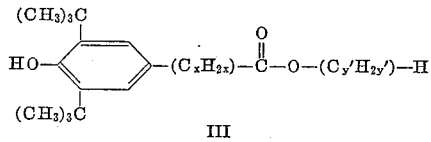

III

By the term "alkyl" and derivations thereof such as "alkylene" or "alkanoyl" is intended when used herein a group containing a branched or straight chain hydrocarbon chain of from 1 to 20 carbon atoms inclusively. Representative of such alkyl groups are thus methyl, ethyl, propyl, butyl, t-butyl, octyl, decyl, dodecyl, tetradecyl, octadecyl, eicosyl and the like.

When the term "alkyl" is herein qualified by the designation "(lower)," there is intended a branched or straight chain hydrocarbon of from 1 to about 6 carbon atoms.

It will be observed, that the di(lower)alkylphenolic moiety in Formula I exhibits at least one (lower)alkyl group in a position ortho to the hydroxy group. The other (lower)alkyl group is either (a) in the other position ortho to the hydroxy group or (b) meta to the hydroxy group and para to the first (lower)alkyl group. Although not so limited, these (lower)alkyl groups are preferably branched groups such as t-butyl. Other arrangements, such as for example a 3-t-butyl-6-methyl-p-phenolic moiety, are however clearly envisioned.

The compounds of the present invention may be prepared via usual esterification procedures from a suitable alcohol and an acid of the formula:

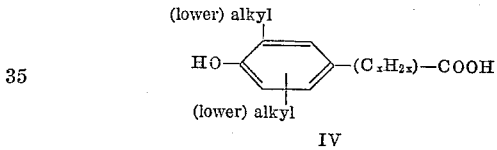

IV or an acid halide, acid anhydride or mixed anhydride thereof.

Similarly the novel esters of this invention may be prepared by conventional methods of transesterification.

Alternatively when $x=2$, the compounds of the present invention may be prepared by treating a dialkylphenol in basic media with an olefinic ester of the formula:

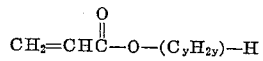

The compounds of this invention may also be prepared by treating a dialkylphenol with a haloalkanoate ester of the formula:

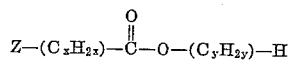

in which A is halogen; e.g., Cl, Br, etc.

Stabilized compositions embracing the compounds of this invention, alone or in combination with other stabilizing materials, are more fully described in our copending application Ser. No. 164,618 filed Jan. 5, 1962.

The present application is a continuation-in-part of Ser. No. 276,192 filed Apr. 29, 1963 which is a continuation-in-part of Ser. No. 164,618 filed Jan. 5, 1962 which in turn is a continuation-in-part of Ser. No. 148,738 filed Oct. 30, 1961.

The following examples, presented for illustration and not limitation, will further serve to typify the nature of the present invention. In these examples, parts are by weight unless otherwise specified and temperature is expressed in degrees centigrade. The relationship between parts by weight and parts by volume is as that of grams to cubic centimeters.

Example 1.—Methyl 3,5-di-t-butyl-4-hydroxyphenylacetate

Seventeen parts of 3,5-di-t-butyl-4-hydroxyphenylacetic acid and 0.5 part of p-toluenesulfonic acid are dissolved in 200 parts by volume of methanol and heated under reflux for 3 hours. The brown reaction mixture is poured onto crushed ice and the precipitated methyl ester filtered by suction. The filter cake is dispersed in saturated bicarbonate solution, filtered, washed neutral with distilled water and dried. Seventeen parts of methyl 3,5-di-t-butyl-4-hydroxyphenylacetate, M.P. 79–83° are thus obtained and further purified by distillation, B.P. 117–118°/0.1–0.05 mm. followed by recrystallization from hexane: petroleum ether, final M.P. 85–86.5°.

Calc. for $C_{17}H_{26}O_3$: C, 73.34; H, 9.41. Found: C, 73.53; H, 9.17.

Methyl 3,5-di-t-butyl-4-hydroxyphenylhexanoate is prepared in an analogous manner from ω-[3,5-di-t-butyl-4-hydroxyphenyl]hexanoic acid.

Example 2.—n-Octadecyl 3,5-di-t-butyl-4-hydroxyphenylacetate

Methyl 3,5 - di - t - butyl - 4 - hydroxyphenylacetate (7.2 parts), 7 parts of n-octadecyl alcohol and 0.1 part of sodium methylate are heated under nitrogen at 130° for one and a half hours. The mixture is flushed with nitrogen to collect methanol formed in the course of the reaction and the methanol is collected in a Dry Ice-acetone cooled trap. After 1.2 parts of methanol are collected, the reaction mixture is heated at 150° and 0.05 mm. pressure for an additional 3 hours. The homogeneous reaction mixture is then dissolved in 40 parts by volume of hexane and cooled for crystallization. The crystalline precipitate, consisting of unreacted n-octadecyl alcohol, is filtered and the filtrate is concentrated under vacuum. The residue weighs 6.6 parts and is purified by high vacuum distillation. After a forerun, consisting of 2.3 parts of unreacted methyl 3,5-di-t-butyl-4-hydroxyphenylacetate, 4.3 parts of n-octadecyl 3,5-di-t-butyl-4-hydroxyphenylacetate are collected at 230°/0.075 mm. The n-octadecyl 3,5-di-t-butyl-4-hydroxyphenylacetate thus obtained as an oily ester, solidifies on long standing and demonstrates a melting point of 33–35°.

Calc. for $C_{34}H_{60}O_3$: C, 79.17; H, 11.73. Found: C, 78.44; H, 11.23.

Octadecyl 3,5-di-t-butyl-4-hydroxyphenylhexanoate is prepared in an analogous manner from methyl 3,5-di-t-butyl-4-hydroxyphenylhexanoate.

Example 3.—n-Octadecyl 3,5-di-t-butyl-4-hydroxybenzoate (a) *Methyl 3,5-di-t-butyl-4-hydroxybenzoate.* — Forty parts of 2,6-di-t-butylphenol are dissolved in 150 parts by volume of methanol. To this solution are added 60 parts of sodium hydroxide as a 40% aqueous solution, followed by 1 part of cupric sulfate. The resulting mixture is then treated with 40 parts of carbon tetrachloride, which is added dropwise over a 15–20 minute interval. This causes the reaction temperature to rise to 75–80°. Stirring is continued for 10 minutes after the addition of all reactants.

After cooling to room temperature, the reaction mixture is poured into 700 parts of water and the resulting solids are filtered to yield 68.5 parts of product. Further purification is achieved by recrystallization from aqueous acetic acid, benzene between hexane or cyclohexane. Use of the last-named solvent gives almost white crystals, M.P. 162–163°.

(b) *n-Octadecyl 3,5 - di-t-butyl - 4 - hydoxybenzoate.*—Methyl 3,5-di-t-butyl-4-hydroxybenzoate (6.6 parts), 13.5 parts of n-octadecyl alcohol and 0.2 part of sodium methylate are mixed at room temperature and then heated at 150±5° for 10 hours. During the final 2 hours of heating, an initial vacuum of 10–33 mm. is applied, followed by a high vacuum of 0.5–1 mm. for 0.2 hour. Removal of most of the impurities is accomplished by distillation at 125–185°/0.25 mm. The residue (11.0 parts) is further purified by crystallization from acetone-cyclohexane to give a white crystalline product, melting at 65–67°.

Calc. for $C_{33}H_{68}O_3$: C, 78.83; H, 11.63. Found: C, 79.15; H, 11.86.

Example 4.—n-octadecyl β-(3,6-di-t-butyl-4-hydroxyphenyl)-propionate 1-octadecanol (3.63 parts) and 3.75 parts of β-(3,5-di-t-butyl-4-hydroxyphenyl)-propionic acid are dissolved in 40 parts by volume of benzene. One half part of p-toluenesulfonic acid is added and the mixture refluxed with stirring for two and one-half hours. Approximately the theoretical amount of water (0.34 part) is collected during this time by azeotroping with benzene. At the end of the reflux period, the brownish solution is cooled, filtered and stripped of benzene in vacuo. The residue (7 parts), which crystallizes upon standing, is recrystallized from 3:2 methanol:ethyl acetate to yield 4 parts of the n-octadecyl β-(3,5-di-t-butyl-4-hydroxyphenyl-propionate, which is a white, crystalline powder, M.P. 49–50°.

Saponification equivalent—Calc. for $C_{35}H_{62}O_3$: 530.9. Found: 526.6.

Octadecyl β-(3-n-hexyl - 4 - hydroxy-5-t-butylphenyl)-propionate is prepared in an analogous manner from β-(3-n-hexyl-4-hydroxy-5-t-butylphenyl)-propionic acid.

Example 5.—n-Hexyl 3,5-di-t-butyl-4-hydroxyphenylbenzoate n-Hexanol (1.84 parts) and 1.82 parts of triethylamine are dissolved in 50 parts by volume of dry benzene. 3,5-di-t-butyl-4-hydroxybenzoylchloride (4.72 parts) dissolved in 25 parts by volume of dry benzene is added dropwise with stirring at 25–30° over a period of 10 minutes. The reactants are then heated under reflux for 3 hours after which time 1.6 parts of triethylamine hydrochloride are removed by filtration. The yellow filtrate is washed with saturated sodium chloride solution, twice with 2N aqueous sodium carbonate solution and then again with saturated sodium chloride solution. After drying the solution over anhydrous sodium sulfate, the solvent is removed by evaporation. Six parts of a solid residue are thus obtained and purified by vacuum distillation. The n-hexyl 3,5-di-t-butyl-4-hydroxyphenylbenzoate distills at 150–155°/0.1 mm., M.P. 70–72°. The yield of the pure product is 3 parts.

n-Tetracosyl 3,5-di-t-butyl-4-hydroxyphenylbenzoate is pared in an analogous manner with tetracosyl alcohol.

Example 6.—n-Dodecyl 3,5-di-t-butyl-4-hydroxyhenylbenzoate n-Dodecanol (2.78 parts) and 1.88 parts of triethylamine are dissolved in 50 parts by volume of dry benzene and 5.0 parts of 3,5-di-t-butyl-4-hydroxybenzoylchloride dissolved in 25 parts by volume of dry benzene are added dropwise with stirring at 25–30° over a period of 10 minutes. The reactants are then heated under reflux for 3 hours. Triethylamine hydrochloride (1.85 parts) is removed by filtration and the yellow filtrate is washed with saturated sodium chloride solution, twice with 2 N aqueous sodium bicarbonate solution, and again with saturated sodium chloride solution. The solution is then dried over anhydrous sodium sulfate and the solvent evaporated under vacuum. The residue comprising n-dodecyl 3,5-di-t-butyl-4-hydroxybenzoate (8 parts) is distilled at 189–193°/1–2 microns, M.P. 47–53°.

Example 7.—Neo-dodecyl 3-(3,5-di-t-butyl-4-hydroxyphenyl)-propionate

Methyl 3-(3,5-di-t-butyl-4-hydroxyphenyl) - propionate (29.2 parts), 18.6 parts of neo-dodecanol and 0.270 part of sodium methylate are treated as described in Example 2. The reaction mixture is then dissolved in benzene, ether is added and the resulting solution washed successively with water and saturated aqueous sodium chloride solution and then dried over sodium sulfate. The solution is next filtered and the filtrate stripped of solvents under diminished pressure. The residue is distilled in vacuo to yield 18.7 parts of neo-dodecyl 3-(3,5-di-t-butyl-4-hydroxphenyl)-propionate, M.P. 190°/0.20 mm.–191.5°/0.15 mm.

Calc. for $C_{29}H_{50}O_3$: C, 77.97; H, 11.28. Found: C, 78.17; H, 11.23.

*Example 8.—Methyl β-(3,5-di-t-butyl-4-hydroxyphenyl)-propionate*

To 500 parts by volume of dry t-butyl alcohol in a flask fitted with mechanical stirrer, inert gas inlet, thermometer, condenser and dropping funnel are added 2.1 parts of potassium metal. After the ensuing reaction is complete, there are added 37.3 parts of 2,6-di-t-butyl phenol, followed rapidly by 17.7 parts of methylacrylate. The stirred reaction mixture is heated to 50° C. for 18 hours and allowed to cool. The solvent is removed under reduced pressure and the residual mass neutralized by addition of dilute hydrochloric acid. This mixture is then extracted with two portions of 200 parts by volume each of ethyl ether. The combined ethereal extracts are washed with two portions of 100 parts by volume each of water and then dried over anhydrous sodium sulfate. The ether layer is removed by filtration and concentrated on a steam bath. The residual oily mass is then vacuum distilled. The fraction collected at 125–130° C./0.1 mm. crystallized upon standing to yield methyl β-(3,5-di-t-butyl-4-hydroxyphenyl)-propionate, M.P. 63.0–64.5° C. Recrystallization from hexane yields a white solid, M.P. 66.0–66.5° C.

Calc. for $C_{18}H_{28}O_3$: C, 73.93; H, 9.65; saponification equivalent, 292.4. Found: C, 74.27; H, 9.90; saponification equivalent, 292±10.

In a similar fashion, the corresponding alkyl esters are obtained from the respective alkyl acrylates: ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl.

Either benzyltrimethylammonium methoxide or sodamide may be substituted for potassium t-butoxide in this example.

Alternatively, a slurry of 3.5 parts of potassium hydroxide in 500 parts by volume of t-butyl alcohol is used in the place of potassium (as the alcoholate). A somewhat lower yield of the product ester is realized by this method.

*Example 9.—Dodecyl β-(3,5-di-t-butyl-4-hydroxyphenyl)-propionate*

To 500 parts by volume of dry t-butyl alcohol is added 2.2 parts of potassium metal. Upon completion of the ensuing reaction, there is added 44.6 parts of 2,6-di-t-butyl phenol and 57.9 parts of lauryl acrylate in rapid succession. The resulting mixture is heated at reflux for 6 hours and then allowed to cool. The solvent is removed under reduced pressure and the residual mass neutralized with very dilute hydrochloric acid. The reaction mixture is extracted with two portions of 300 parts by volume of 1:1 ethyl ether:petroleum ether and the combined extracts washed with two portions of 100 parts by volume of water. The extract is then dried over anhydrous sodium sulfate, the drying agent removed by filtration and the ethereal solution concentrated with a final temperature of 200° at a pressure of 0.1 mm. to yield dodecyl β-(3,5-di-t-butyl-4-hydroxyphenyl)-propionate.

Calc. for $C_{29}H_{50}O_3$: C, 78.10; H, 11.30. Found: C, 77.90; H, 11.48.

*Example 10.—Ethyl α-(4-hydroxy-3,5-di-t-butylphenyl)-isobutyrate*

To 200 parts by volume of dry t-butyl alcohol in suitable flask fitted with mechanical stirrer, inert gas inlet, thermometer, condenser and dropping funnel is added 22.4 parts of potassium t-butoxide, 41.2 parts of 2,6-di-t-butyphenol and 50 parts by volume of triethylene glycol dimethyl ether. The dark green solution is stirred and a solution of an equimolar portion of ethyl α-bromo-α-methyl-propionate in 50 parts of t-butyl alcohol is added dropwise over 20–60 minutes. After addition is complete, the reaction is refluxed for 1 hour, the solution then being neutral. The reaction mixture is poured into water and extracted with ether. The ethereal solution is washed with water and dried and the ether removed by distillation, the product being isolated by vacuum distillation.

*Example 11.—Ethyl α-(4-hydroxy-3,5-di-t-butylphenyl)-propionate*

By substitution ethyl α-bromopropionate for ethyl α-bromo-α-methylpropionate in the procedure of Example 10, there is obtained the product of this example, M.P. 54–56°.

Calc. for $C_{19}H_{30}O_3$: C, 74.70; H, 9.87. Found: C, 74.49; H, 9.73.

*Example 12.—Methyl β-(3-methyl-4-hydroxy-5-t-butylphenyl)-propionate*

By employing 2-methyl-6-t-butylphenol in place of 2,6-di-t-butylphenol in the procedure of Example 8, the product is obtained boiling at 136–144°/0.02 mm.

*Example 13.—Octadecyl α-(4-hydroxy-3,5-di-t-butylphenyl)-isobutyrate*

A solution of 16 parts of ethyl α-(4-hydroxy-3,5-di-t-butylphenyl)-isobutyrate, 13.5 parts of n-octadecyl alcohol and 0.5 part of sodium methylate in 150 parts by volume of o-dichlorobenzene is distilled under a nitrogen atmosphere until the vapor temperature reaches and remains at the boiling point of o-dichlorobenzene (180–183°). The solution is then refluxed for 6 hours, cooled and neutralized with a few drops of acetic acid. The solvent is removed under vacuum on a water bath and the product after two recrystallizations from methanol melts at 46–48°. The yield is 57%.

*Example 14.—Octadecyl α-(4-hydroxy-3,5-di-t-butylphenyl)-propionate*

A solution of 20 parts of ethyl α-(4-hydroxy-3,5-di-t-butylphenyl)-propionate, 17.65 parts of n-octadecyl alcohol and 0.5 part of sodium methylate in 150 parts by volume of dry toluene is distilled under a nitrogen atmosphere until the vapor temperature reaches and remains at the boiling point of toluene. The solution is then cooled and neutralized with acetic acid. The solvent is removed under vacuum on a water bath and the product after two recrystallizations from methanol melts at 46–47°. The yield is 53%.

*Example 15.—Ethyl (3,5-di-t-butyl-4-hydroxyphenyl)-acetate*

Anhydrous gaseous hydrogen chloride is bubbled through a solution of 24.5 parts of 3,5-di-t-butyl-4-hydroxybenzylcyanide at 0–5° for 4 hours and then at 20–25° for 2 hours. The reaction mixture is allowed to stand overnight and then poured with stirring into 600 parts of water at 25°. The oily dispersion is heated at 60–65° for one and a half hours. The mixture is then cooled to room temperature and extracted with two portions of 200 parts by volume each of benzene. The benzene extract is in turn washed with two portions of 100 parts by volume each of water and two portions of 100 parts by volume each of saturated aqueous sodium bicarbonate. After removal of benzene, the residual product is purified by distillation, B.P. 111–113°/0.08–0.10 mm. Ethyl (3,5-di-t-butyl-4-hydroxyphenyl)-acetate is thus obtained as a colorless liquid which solidifies upon standing, M.P. 48–49.5°.

What is claimed is:

1. A compound of the formula:

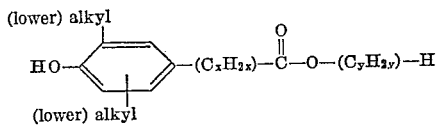

in which $x$ has a value of from 1 to 5 inclusively and $y$ has a value of from 6 to 30 inclusively.

2. A compound of the formula:

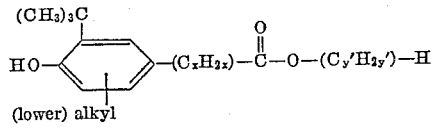

in which $x$ has a value of from 1 to 5 inclusively and $y'$ has a value of from 6 to 20 inclusively.

3. A compound of the formula:

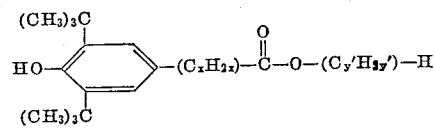

in which $x$ has a value of from 1 to 5 inclusively and $y'$ has a value of from 6 to 20 inclusively.

4. n-Octadecyl 3,5-di-t-butyl-4-hydroxyphenylacetate.

5. Neo - dodecyl 3 - (3,5 - di - t - butyl - 4 - hydroxyphenyl)-propionate.

6. Dodecyl β-(3,5-di-t-butyl-4-hydroxyphenyl)-propionate.

7. Ethyl α - (4 - hydroxy - 3,5 - di - t - butylphenyl)-isobutyrate.

8. Octadecyl α - (4 - hydroxy - 3,5 - di - t-butylphenyl)-isobutyrate.

9. Octadecyl α - (4 - hydroxy - 3,5 - di - t - butyl-phenyl)-propionate.

10. n - Octadecyl β - (3,5 - di - t - butyl - 4 - hydroxyphenyl)-propionate.

References Cited

UNITED STATES PATENTS 3,029,276  4/1962  Hausweiler et al. _____ 260—473

FOREIGN PATENTS 812,245  4/1959  Great Britain.

LORRAINE A. WEINBERGER, *Primary Examiner.*

SIDNEY B. WILLIAMS, JR., *Assistant Examiner.*